(12) United States Patent
Jamison

(10) Patent No.: US 8,981,295 B2
(45) Date of Patent: Mar. 17, 2015

(54) NIGHT VISION DEVICE WITH DISPLAY OF ANCILLARY ENVIRONMENTAL INFORMATION

(76) Inventor: Kenneth Jamison, Boerne, TX (US)

( * ) Notice: Subject to any disclaimer, the term of this patent is extended or adjusted under 35 U.S.C. 154(b) by 415 days.

(21) Appl. No.: 13/552,508

(22) Filed: Jul. 18, 2012

(65) Prior Publication Data

US 2013/0043395 A1 Feb. 21, 2013

Related U.S. Application Data

(60) Provisional application No. 61/508,970, filed on Jul. 18, 2011.

(51) Int. Cl.
  *G01J 5/10* (2006.01)
  *G02B 23/12* (2006.01)
  *G01J 5/08* (2006.01)
  *F41G 1/32* (2006.01)

(52) U.S. Cl.
  CPC . G02B 23/12 (2013.01); G01J 5/10 (2013.01); *G01J 5/0846* (2013.01); *F41G 1/32* (2013.01)
  USPC .......................................... 250/333; 250/330

(58) Field of Classification Search
  CPC ........................................................ G01J 5/10
  USPC .................................. 250/330, 333
  See application file for complete search history.

(56) References Cited

U.S. PATENT DOCUMENTS

| | | | |
|---|---|---|---|
| 5,687,034 A | 11/1997 | Palmer | |
| 5,892,617 A * | 4/1999 | Wallace | 359/353 |
| 6,072,565 A | 6/2000 | Porter | |
| 6,121,600 A | 9/2000 | Saldana et al. | |
| 7,810,168 B2 | 10/2010 | Reed et al. | |
| 7,829,874 B2 | 11/2010 | Gaber | |
| 7,842,921 B2 | 11/2010 | Reed et al. | |
| 7,864,432 B2 | 1/2011 | Ottney | |
| 7,913,441 B1 | 3/2011 | Reed | |
| 8,156,679 B1 * | 4/2012 | Swan | 42/124 |
| 2008/0263752 A1 | 10/2008 | Solinsky et al. | |
| 2014/0112537 A1 * | 4/2014 | Frank et al. | 382/103 |

OTHER PUBLICATIONS

Morovision, Magnetic Compass for Night Vision Devices, http://www.morovision.com/mvnv_accessories/cases_compasses/magnetic_compass.html, Morovision Night Vision, Inc., Laguna Hills, California, United States.

* cited by examiner

*Primary Examiner* — Casey Bryant
(74) *Attorney, Agent, or Firm* — Kammer Browning PLLC

(57) ABSTRACT

A night vision goggle (NVG) attachment device retrofit to an existing monocular or binocular type NVG system to provide additional environmental information to the user of the NVG device. The attachable device includes a ring connector having one or more external display projectors positioned on the objective side of the NVG optical system. A sensor electronics module is attached to the ring connector and houses a number of environmental sensors, including IR transmitters and receivers for range finding information, radiation detectors, and motion/heat detectors. The sensors within the electronics module provide signal information through a connector to the existing NVG electronics. The device projects informational images into the display field of view for the user. The informational displays may take the form of one or more LED indicators or LED digital numerical displays. The user may preferably activate or de-activate one or more of the environmental sensors.

18 Claims, 6 Drawing Sheets

NIGHT VISION DEVICE WITH DISPLAY OF ANCILLARY ENVIRONMENTAL INFORMATION

CROSS REFERENCES TO RELATED APPLICATIONS

This application claims the benefit under Title 35 United States Code §119(e) of U.S. Provisional Application 61/508,970 filed Jul. 18, 2011, the full disclosure of which is incorporated herein by reference.

BACKGROUND OF THE INVENTION

1. Field of the Invention

The present invention relates generally to night vision goggles and similar devices that utilize light intensifier tubes to provide a visual display of the infrared emissions in a field of view. The present invention relates more specifically to ancillary sensor attachments for night vision equipment that provide range information, radiation detection, motion detection, and heat sensing.

2. Description of the Related Art

Night vision goggles and devices that utilize light intensifier tubes to display visual images of infrared (IR) emissions within a field of view are known in the art. Such devices take the form of monoculars and binoculars and various other devices for displaying a field of view under low visual light conditions. Generally these devices operate by taking low level visual light and amplifying it within a display and/or taking infrared light and representing the same with visual light emissions from a light intensifier tube.

In general, when an individual using a night vision devices focuses on the field of view within the display of the device, it is difficult to gather and discern other information about the environment within which the user is operating. Under circumstances where night vision equipment is used, it is highly desirable to have a better knowledge of the environment, including information such as radiation levels, motion detection, heat detection, and range information.

While the user of a night vision device is focused on the field of view provided by the light intensifier tube, such helpful ancillary information about the environment is difficult to acquire. It would be desirable if a night vision device incorporated additional components that gathered such ancillary information about the environment and presented the information in a meaningful way on one or more displays positioned within the light intensifier tube display field of view presented to the user. It would be helpful if such informational displays did not interfere with the primary field of view presented by the night vision device, and if such displays could be alternately activated or de-activated, depending upon the environment of operation.

SUMMARY OF THE INVENTION

In fulfillment of the above objectives, the present invention provides a night vision goggle (NVG) attachment device that may be retrofit to an existing monocular or binocular type NVG system so as to provide additional environmental information to the user of the NVG device. The attachable device includes a ring connector having one or more external display projectors positioned on the objective side of the NVG optical system. A sensor electronics module is attached to the ring connector and houses a number of environmental sensors, including IR transmitters and receivers for range finding information, radiation detectors, and motion/heat detectors.

The sensors within the electronics module of the device provide signal information through a connector component to the existing night vision device electronics. The device projects informational images into the display in a manner that transmits the information into the field of view (preferably above or below the primary field of view) for the user of the NVG device. The informational displays may take the form of one or more LED indicators or LED digital numerical displays. The user may preferably activate or de-activate one or more of the environmental sensors associated with the system of the invention.

DETAILED DESCRIPTION OF THE PREFERRED EMBODIMENTS

Figure 1:
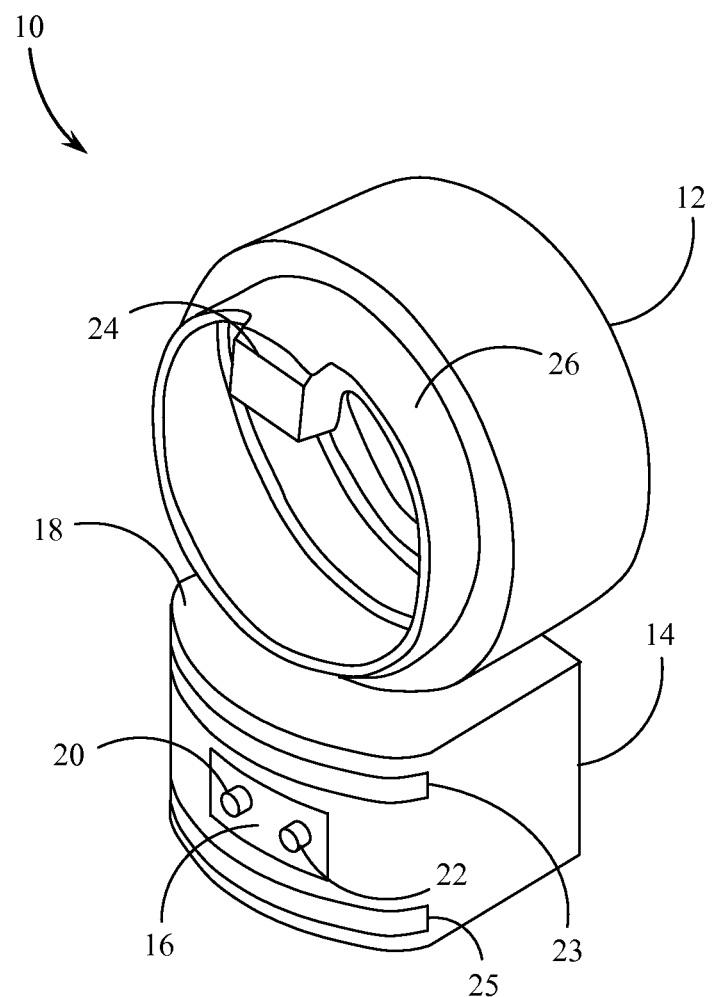
FIG. 1 is a perspective view of a first preferred embodiment of the NVG attachment device of the present invention.

Reference is made first to FIG. 1 for a description of the various external components associated with a first preferred embodiment of the night vision goggle (NVG) attachment device of the present invention. In FIG. 1, night vision goggle attachment device 10 generally comprises ring connector 12 and device housing 14. Positioned on a forward looking face of device housing 14 are range finder components 16. These range finder components 16 are integrated into sensor electronics module 18 which incorporates all of the necessary electronics associated with the various sensor and detector devices of the present invention. Sensor electronics module 18 also incorporates any electronics necessary to translate signals from the sensor components into the driver elements (internal to electronics module 18) that ultimately drive the display projector components of the device, such as display projector 24 positioned at a top (twelve o'clock orientation) on ring connector 12.

Range finder components 16 in the first preferred embodiment shown in FIG. 1 generally comprise IR transmitter 20 and IR sensor/receiver 22. In the preferred embodiment, IR transmitter 20 emits a coherent infrared beam that may be directed at an object within the field of view and be reflected back to IR sensor/receiver 22 for time of flight (TOF) measurements. Because the night vision device associated with the use of the present invention will typically be gathering infrared light in any case, the range finder components would preferably operate at specific frequencies or with specific signal features that could be distinguished from the balance of the environmental infrared radiation being detected. In this manner, the specific IR beam transmitted by IR transmitter 20 is detected and isolated by IR sensor 22 and the associated electronics.

Radiation detector 23 may preferably be positioned as shown in FIG. 1 on sensor electronics module 18 on device housing 14. In a similar manner, motion/heat detector 25 may be positioned in a manner that allows for a field of view similar to that achieved by the NVG device in general. Each of these additional detectors 23 and 25 likewise utilize electronics within sensor electronics module 18 to provide signal information to the display projector devices for translation of the sensed characteristics into quantitative or qualitative information.

FIG. 1 provides an example of display projector 24 positioned at the top (twelve o'clock) position of ring connector 12. Those skilled in the art will recognize that alternate placement of display projector 24 may be made in addition to the placement of two or more display projectors within the field of view provided by ring connector 12. Also positioned in conjunction with display projector 24 on ring connector 12 is optional filter connector ring 26 which simply moves the filter ring connector structure from the night vision goggle outward to the exterior of the NVG attachment device 10. In this manner, NVG attachment device 10 may fit to the night vision device with ring connector 12 and not obstruct or prohibit the use of the usual optional filters associated with night vision devices.

Figure 2:
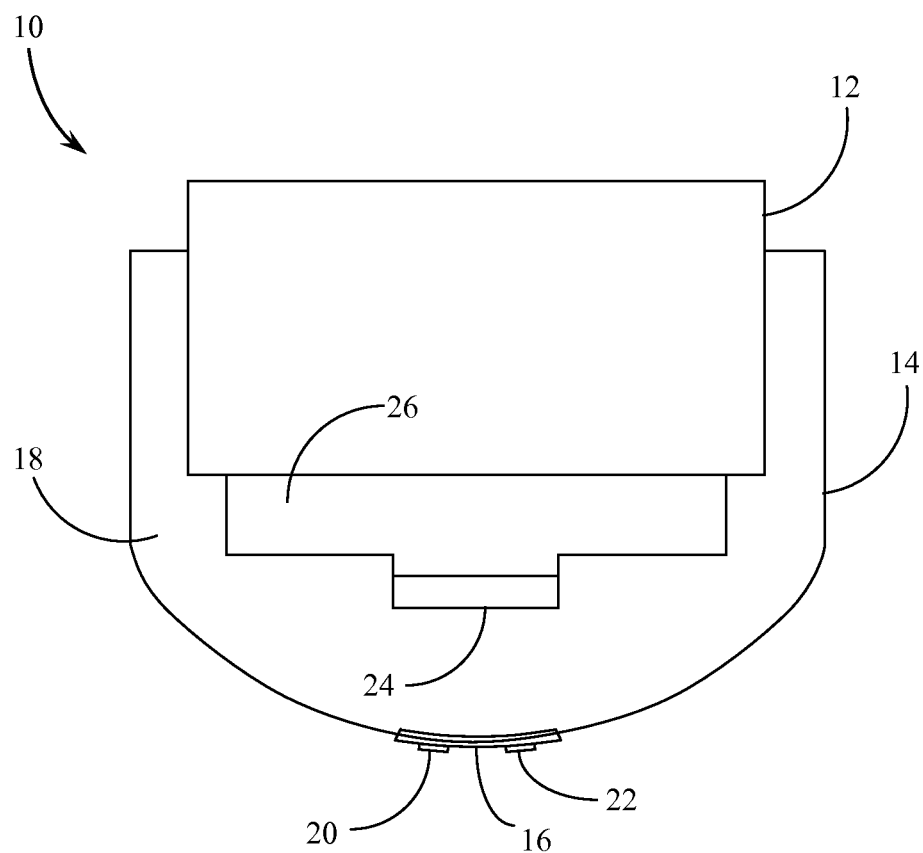
FIG. 2 is a top plan view of the first preferred embodiment of the NVG attachment device of the present invention.

Reference is next made to FIG. 2 which provides a top plan view of the first preferred embodiment of the NVG attachment device shown in FIG. 1. In this view of FIG. 2, the orientation and arrangement of the various forward looking components of the system of the device may be seen. NVG attachment device 10 is shown to include ring connector 12 which extends to the back of the device in a manner that allows for its connection to the night vision equipment. Device housing 14 extends beneath and slightly forward of ring connector 12 and provides the necessary enclosure for sensor electronics module 18. Towards the front, and looking forward on device housing 14, are range finder components 16 as described above, incorporating IR transmitter 20 and IR sensor 22. Also shown in FIG. 2 is representative display projector 24 positioned in conjunction with optional filter connector ring 26.

Figure 3:
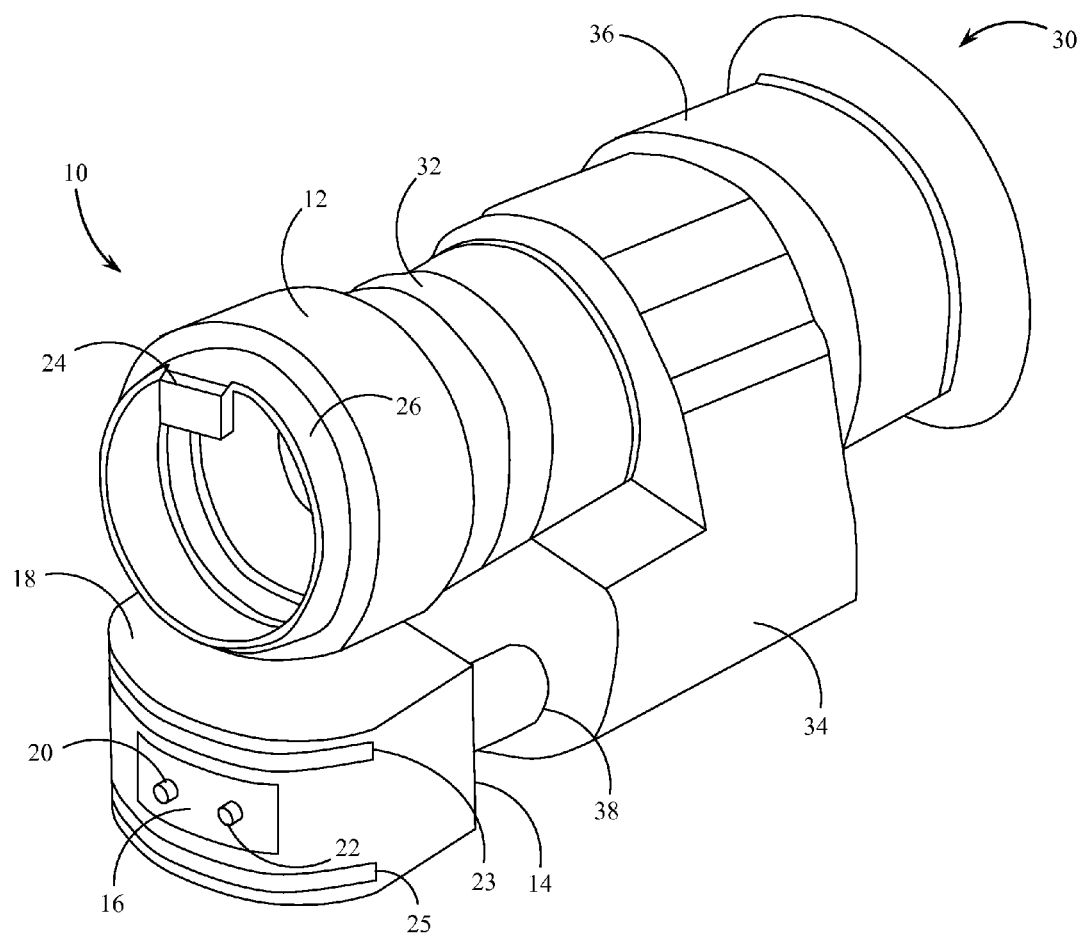
FIG. 3 is a perspective view of the first preferred embodiment of the NVG attachment device shown attached to a night vision monocular.

FIG. 3 provides an overview of one manner of attachment of the device of the present invention to a typical night vision device. In the example shown, the night vision device is a monocular device that presents a single circular display field of view to the user. Those skilled in the art will recognize that the system of the present invention may be utilized in conjunction with a wide variety of night vision devices, including monoculars, binoculars, and other systems with or without eyepiece components. In FIG. 3, NVG attachment device 10 is shown to have ring connector 12 which serves to attach the device by way of optical interface 32 to the night vision monocular 30. Connection between NVG attachment device 10 and the night vision monocular 30 is accomplished in general in the same manner with which optional filters are attached to the front end (forward facing objective end) of the NVG device.

Also shown in FIG. 3 are the existing night vision device optics 36 and night vision device electronics 34. In the preferred embodiment of the present invention there may be a connection between the NVG attachment device 10 and the night vision monocular 30 through and between the power and electronics components of the elements. In other words, in addition to the optical connection made between the components, power and some signal connections are desirable through electronic signal connection 38 between night vision device electronics 34 and sensor electronics module 18 housed within device housing 14.

While most of the display information is electronically provided by way of the signal line connections internal to NVG attachment device 10 (i.e., between sensor electronics module 18 and display projector 24) some additional signal information and power connections are desirable between the two components. Electronics signal connection 38 provides such a desired connection and requires minimal modification to the structures of night vision electronics device 34.

Figure 4A:
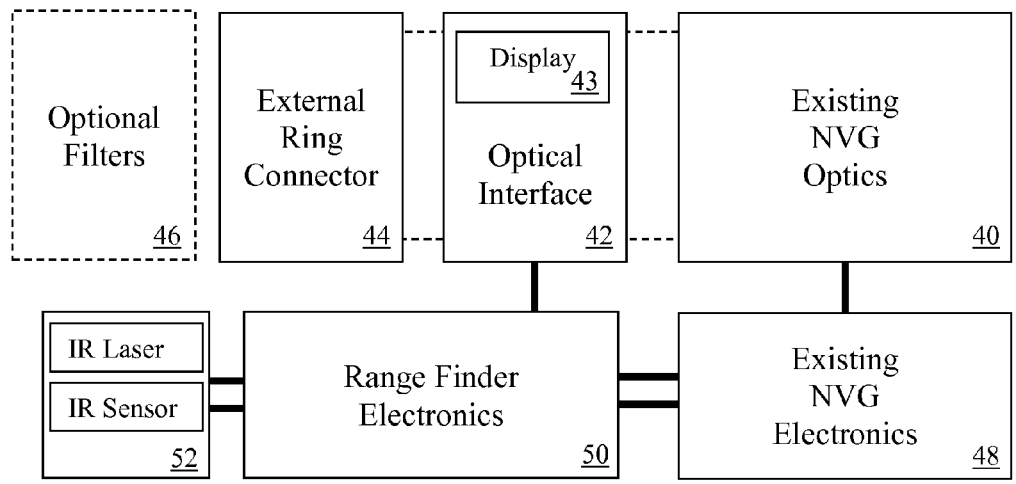
FIG. 4A is a block diagram of the first preferred embodiment of the NVG attachment device of the present invention shown with the range finder option.
Figure 4B:
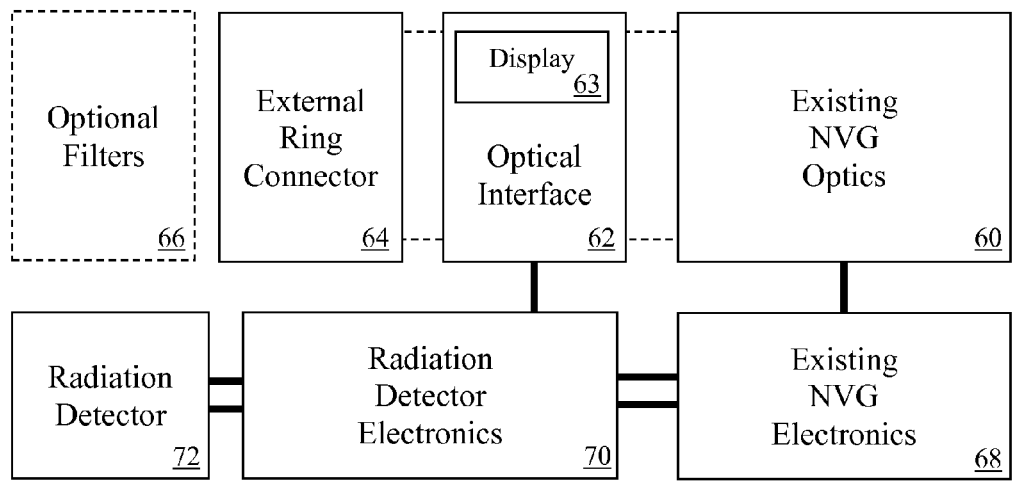
FIG. 4B is a block diagram of the first preferred embodiment of the NVG attachment device of the present invention shown with the radiation detection option.

Reference is next made to FIGS. 4A and 4B which provide schematic block diagrams of two representative implementations of the first preferred embodiment of the NVG attachment device of the present invention. FIG. 4A shows an implementation of the range finder option into the system, while FIG. 4B provides implementation of the radiation detector option. In FIG. 4A, the various components of the overall system are shown. These include the existing NVG optics 40 which are connected to the existing NVG electronics 48. Optical connection between the existing NVG optics 40 and the device of the present invention is provided through optical interface 42 which incorporates display elements 43. The range finder electronics 50 of the present invention are connected to optical interface 42 and display 43 and provide the necessary drivers for allowing display elements 43 to project the information into the existing NVG optics 40. Also associated with optical interface 42 is external ring connector 44 which, as described above, provides for the ongoing attachment of optional filters 46 as with the original NVG equipment.

In the range finder embodiment of the present invention IR laser/IR sensor package 52 is connected to the range finder electronics 50 which again provide the range information to optical interface 42 and thereby to display elements 43. In the preferred embodiment of the present invention, the range finding information is gathered by the use of a coherent IR laser beam directed into the field of view and reflected back to the IR sensor in a manner that isolates a particular object within the field of view and provides range information therefore. Those skilled in the art will recognize that there are other mechanisms for utilizing time of flight signal detection to measure the distance to an object within the field of view. While acoustic emissions are frequently used for time of flight range finding, the ability to narrow an acoustic beam to a specific object within the field of view is generally more difficult than accomplishing the same task with an infrared beam. Nonetheless, various other methods (such as acoustic waves) for providing range finding information are anticipated.

FIG. 4B as indicated above provides radiation detection capabilities to the system of the present invention. Existing NVG optics 60 are once again connected to optical interface 62 which provides display elements 63. Once again, external ring connector 64 provides the ability to connect optional filter 66 to the device as structured prior to implementation of the accessory device of the present invention. Existing NVG electronics 68 are connected to and drive existing NVG optics 60 and are likewise interfaced with radiation detector electronics 70. Radiation detector 72 is connected to radiation detector electronics 70 through which the detected signal information is translated into a display signal appropriate for use by display elements 63 in optical interface 62.

Significant improvements have been made in the field of radiation detection that minimizes the size and complexity of detectors necessary to identify and quantify radiation levels within an immediate environment. The present invention takes advantage of some of the latest solid state devices that detect various forms of radiation including neutron particles and gamma radiation. Depending upon the environment within which the night vision device is intended to operate, radiation detector 72 may be customized to select a particular form of radiation that is anticipated. In a similar manner, radiation detector electronics may selectively drive radiation detector 72 and translate signal information received from detector 72 through optical interface 62 to provide information on display 63.

Figure 5:
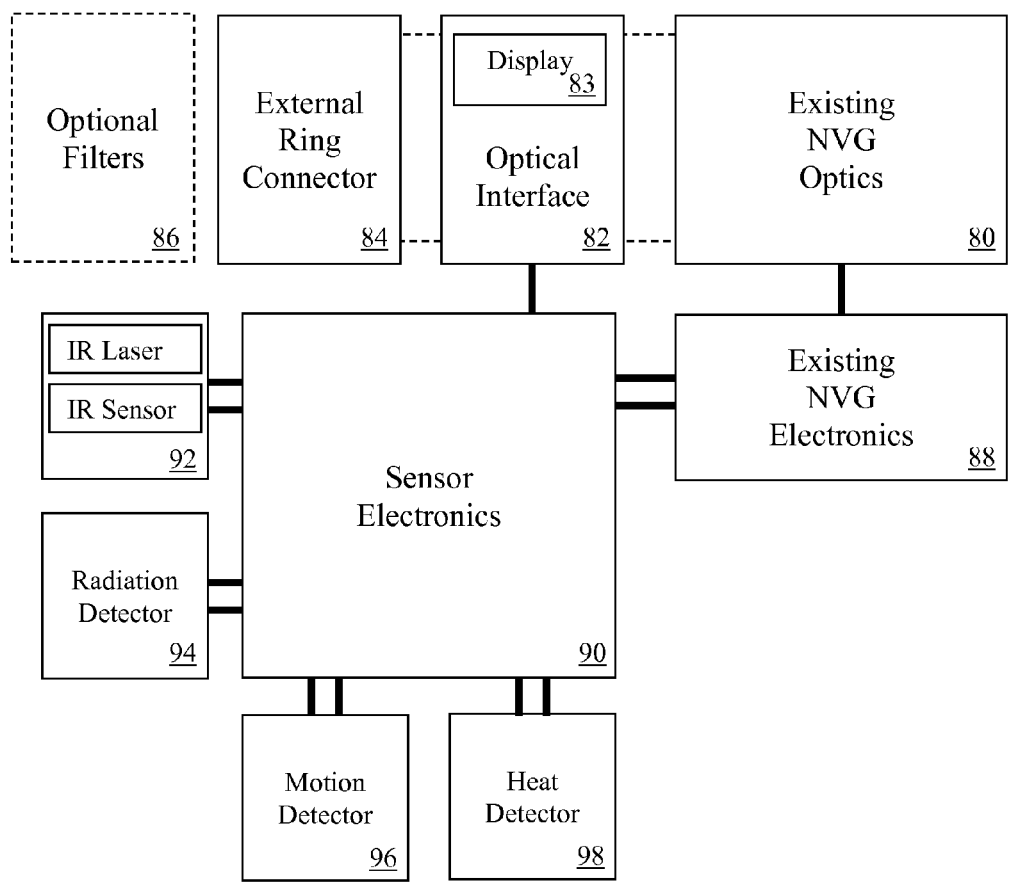
FIG. 5 is a block diagram of the first preferred embodiment of the NVG attachment device of the present invention shown with range finder, radiation detection, motion detection, and heat detection options.

Reference is next made to FIG. 5 which in a manner similar to the schematic block diagrams shown in FIGS. 4A and 4B provides an overview of the functional components associated with an embodiment of the system of the present invention incorporating all of the various environmental detection components. In FIG. 5 existing NVG optics 80 are shown associated with existing NVG electronics 88 both of which are connected to optical interface 82 of the present invention which incorporates one or more display elements 83. In a manner similar to that described above, external ring connector 84 provides the ability to connect optional filters 86.

Sensor electronics 90 in this embodiment will generally be more complex as required to receive and translate the signal information from each of a multitude of detector components and to likewise drive the multiple displays associated with optical interface 82. In FIG. 5, IR laser/IR sensor system 92 is connected to sensor electronics 90, as are radiation detector 94, motion detector 96, and heat detector 98. In the preferred embodiment, motion detector 96 may preferably be a short distance acoustic transmitter/receiver pair that identifies motion by changes in time of flight (TOF) signal information received by the detector. Various other mechanisms for detecting motion such as pattern recognition in the visual and infrared emissions range are anticipated. Heat detector 98 may simply be a quantification of the infrared emissions in the area peripheral to the field of view presented to the NVG user. Again, various other heat detector devices are anticipated as being capable of providing the signal information necessary for use in conjunction with the present invention.

Figure 6A:
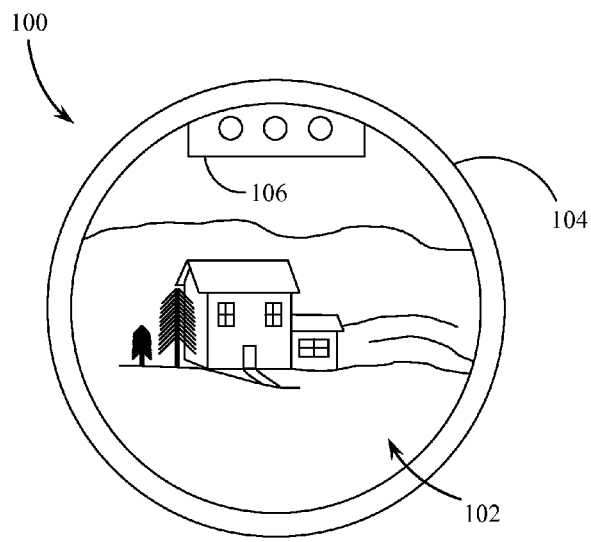
FIG. 6A is a representative eyepiece display of the first preferred embodiment of the NVG attachment device of the present invention shown with the radiation detection option.
Figure 6B:
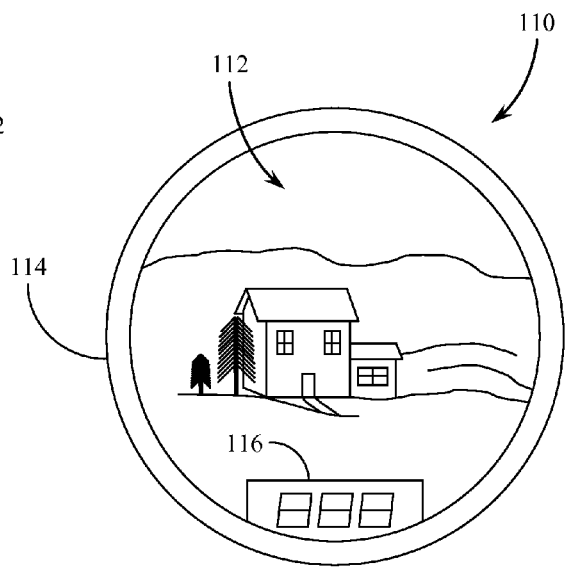
FIG. 6B is a representative eyepiece display of the first preferred embodiment of the NVG attachment device of the present invention shown with the range finder option.
Figure 6C:
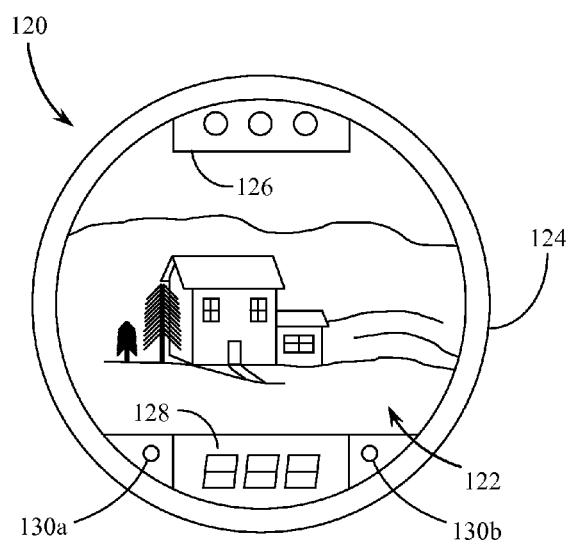
FIG. 6C is a representative display of the first preferred embodiment of the NVG attachment device of the present invention shown with radiation detection, motion detection, and range finder options.

Reference is finally made to FIGS. 6A-6C which provide various alternate arrangements for the field of view of the night vision equipment associated with the attachment device of the present invention. FIG. 6A presents a representative eyepiece display showing use of the radiation detection capability only. In this representative view, optical display 100 provides field of view 102 contained within the field of view ring 104 presented at the eyepiece optics of the device. In this instance, LED indicators 106 are presented at the top (twelve o'clock) position of field of view ring 104 in a manner that generally does not obstruct the primary field of view 102. With range finder functionality, LED indicators 106 may operate as a variable bar meter wherein the illumination of a single LED (on the left, for example) indicates a low level of radiation, whereas illumination of the second and third LEDs represent increased levels of radiation. It is anticipated that this qualitative information associated with radiation levels is preferable than displaying numerical quantitative information that may or may not translate well into the safety or danger of radiation in the environment.

FIG. 6B presents an arrangement wherein optical display 110 provides field of view 112 surrounded by field of view ring 114 and positions digital display 116 at a bottom (six o'clock) position, again not obstructing the primary field of view 112. In the embodiment shown in FIG. 6B the display is digital (quantitative) which preferably may be used in conjunction with the range finder capability of the present invention. As presented in this view, a three digit display might present range information in the form of feet or meters from the user to an object selected at a center point in the field of view. The user may simply re-orient the NVG device to reposition the center of the field of view and thereby know that the range information is specific to that portion of the field of view.

FIG. 6C presents a display that incorporates radiation detection information, motion detection information, and range information. In FIG. 6C optical display 120 defines field of view 122 surrounded by field of view ring 124. In this embodiment, LED indicators 126 (as described above in FIG. 6A) are again positioned at the top (twelve o'clock) position on field of view ring 124. Positioned at the bottom (six o'clock) position are digital display 128 (as shown in FIG. 6B) as well as left motion indicator 130a and right motion indicator 130b. The indication of motion to the user of a night vision device is preferable because the user is typically unaware of activity in the immediate vicinity as the user's visual focus is generally directed through the night vision display. Motion detectors in the present invention might provide a level of qualitative information, not only of the existence of motion, but also to which side of the viewer the motion is occurring. Such left and right motion indicators 130a and 130b provide the appropriate level of information necessary for the user to respond to motion in the immediate vicinity.

Although the present invention has been described in conjunction with preferred embodiments, those skilled in the art will recognize modifications to these embodiments that still fall within the spirit and scope of the invention. The positioning and placement of the specific environmental detection devices are, of course, relevant to the type of information being gathered from the environment, be it visual, infrared, acoustic, or radiation. Some modification of the placement of the sensors and detectors is therefore anticipated. Likewise, some modification of the placement and positioning of the display components is anticipated within the field of view presented by the light intensifier tube of the night vision equipment. In general, the only requirement with regard to the placement of a display projector within the field of view of the light intensifier tube is that it not significantly obstruct the center of the field of view for purposes of conveying the primary subject of the view. In addition, those skilled in the art will recognize the modifications necessary to utilize the system of the present invention in conjunction with monocular devices, binocular devices, and other non-eyepiece based night vision displays. Once again, these modifications, based on the type of night vision equipment to which the system is attached, do not depart from the spirit and scope of the invention.

I claim:

1. An attachable device for connection to an existing monocular or binocular type night vision goggle (NVG) system that provides additional environmental information to the user of the NVG system, the attachable device comprising:
 a ring connector assembly comprising one or more external display projectors positioned on an objective side of the NVG system;

a sensor electronics module attached to the ring connector assembly, the sensor electronics module comprising at least one environmental sensor; and a connector component, the at least one environmental sensor within the sensor electronics module providing signal information through the connector component to the existing NVG system;

wherein the attachable device projects informational images into the display of the NVG system in a manner that transmits the information into the field of view for the user of the NVG system.

2. The attachable device of claim 1 wherein the one or more external display projectors comprise one or more LED indicators and/or LED digital numerical displays.

3. The attachable device of claim 1 further comprising an electronic signal switching device activating and/or de-activating the at least one environmental sensor of the sensor electronics module.

4. The attachable device of claim 1 wherein the one or more external projectors are further positioned on a perimeter edge of the objective side of the NVG system to project informational images into a perimeter edge of the field of view for the user of the NVG system.

5. The attachable device of claim 1 wherein the at least one environmental sensor comprises an IR transmitter and receiver pair for providing range finding signal information.

6. The attachable device of claim 5 wherein the IR transmitter and receiver pair are directed to a point centered in the NVG system field of view.

7. The attachable device of claim 5 wherein the one or more external display projectors comprise an LED digital numerical display for displaying the range finding signal information.

8. The attachable device of claim 1 wherein the at least one environmental sensor comprises a radiation detector.

9. The attachable device of claim 8 wherein the radiation detector comprises multiple detectors for distinguishing various types of radiation and wherein the informational images projected into the display of the NVG system identify the type of radiation to the user.

10. The attachable device of claim 9 further comprising an electronic signal switching device selectively activating one of the multiple detectors for distinguishing various types of radiation.

11. The attachable device of claim 1 wherein the at least one environmental sensor comprises a motion detector.

12. The attachable device of claim 11 wherein the one or more external display projectors comprise two or more LED indicators positioned to indicate within the NVG system a portion of the field of view where motion is detected.

13. The attachable device of claim 1 wherein the at least one environmental sensor comprises a heat detector.

14. The attachable device of claim 13 wherein the one or more external display projectors comprise two or more LED indicators positioned to indicate within the NVG system a portion of the field of view where heat is detected.

15. The attachable device of claim 1 wherein the ring connector assembly comprises an internally threaded portion for threaded attachment to the objective side of the NVG system an externally threaded portion for receiving and securing an optional filter.

16. The attachable device of claim 1 wherein the sensor electronics module is attached to the ring connector assembly in a parallel orientation such that a field of view of the at least one environmental sensor is generally the same as the field of view of the NVG system.

17. An attachable device for connection to an existing monocular or binocular type night vision goggle (NVG) system, the NVG system having an optics assembly and a field of view, the attachable device providing additional field of view environmental information to the user of the NVG system, the attachable device comprising:

a ring connector assembly comprising one or more external display projectors positioned on an objective side of the optics assembly of the NVG system;

a sensor electronics module attached in parallel to the ring connector assembly, the sensor electronics module comprising a plurality of environmental sensors, the plurality of environmental sensors comprising at least one IR transmitter/receiver pair for range finding information, at least one radiation detector, and at least one of a motion or a heat detector; and a connector component, the plurality of environmental sensors within the sensor electronics module providing signal information through the connector component to the existing NVG system;

wherein the attachable device projects informational images into the display of the NVG system in a manner that transmits the information into the field of view for the user of the NVG system.

18. The attachable device of claim 17 wherein the one or more external display projectors comprise:

at least one LED digital numerical display, displaying range finding signal information from the at least one IR transmitter/receiver pair;

at least one LED indicator, indicating radiation signal information from the at least one radiation detector; and at least two LED indicators, indicating motion or heat signal information from the at least one of a motion or heat detector, the at least two LED indicators positioned to indicate within the NVG system a portion of the field of view where motion or heat is detected.

* * * * *